United States Patent
Engstrom et al.

(10) Patent No.: US 10,710,440 B1
(45) Date of Patent: Jul. 14, 2020

(54) GLASS RUN SEAL COMPRISING CORNER MOLDINGS WITH INTEGRATED WINDOW SPACERS

(71) Applicant: Toyota Motor Engineering & Manufacturing North America, Inc., Plano, TX (US)

(72) Inventors: Peter J. Engstrom, Howell, MI (US); Hideaki Kanasugi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/397,063

(22) Filed: Apr. 29, 2019

(51) Int. Cl.
*B60J 10/76* (2016.01)
*B60J 10/27* (2016.01)
*B60J 10/21* (2016.01)

(52) U.S. Cl.
CPC ............. *B60J 10/76* (2016.02); *B60J 10/21* (2016.02); *B60J 10/27* (2016.02)

(58) Field of Classification Search
CPC ............. B60J 10/21; B60J 10/27; B60J 10/76
See application file for complete search history.

(56) References Cited

U.S. PATENT DOCUMENTS

| | | | | |
|---|---|---|---|---|
| 7,294,386 | B2 * | 11/2007 | Murase | B60R 21/205 428/120 |
| 7,383,662 | B2 * | 6/2008 | Tamaoki | B60J 10/246 49/428 |
| 8,196,354 | B2 * | 6/2012 | Ota | B60J 10/277 49/441 |
| 8,458,959 | B2 * | 6/2013 | Ohtake | B60J 5/0402 49/479.1 |
| 9,308,801 | B2 * | 4/2016 | Lahnala | B60J 1/1861 |
| 9,475,372 | B2 | 10/2016 | Doniga-Crivat et al. | |
| 9,475,374 | B2 * | 10/2016 | Murree | B29D 99/0053 |
| 9,708,846 | B2 * | 7/2017 | Masumoto | B60J 10/27 |
| 2013/0168995 | A1 * | 7/2013 | Kobayashi | B60J 10/76 296/146.2 |
| 2018/0339582 | A1 * | 11/2018 | Taketomo | B60J 10/76 |

FOREIGN PATENT DOCUMENTS

JP 2000094967 A 4/2000

* cited by examiner

*Primary Examiner* — Catherine A Kelly
(74) *Attorney, Agent, or Firm* — Christopher G. Darrow; Darrow Mustafa PC

(57) ABSTRACT

A glass run seal includes a glass run seal molding having a substantially c-shaped cross-section channel comprising a base, an inner sidewall, and an outer sidewall, the glass run seal molding extending along a length and comprising a top portion that extends substantially horizontally from a first end to an opposed second end; a first side portion that extends downwardly away from the top portion; a first corner portion joining the first end of the top portion and the first side portion, the first corner portion comprising a first rib protruding outwardly away from the base; a second side portion joining the second end of the top portion and the second side portion, the second corner portion comprising a second rib protruding outwardly away from the base, the first rib and the second rib configured to provide a predetermined gap between the base and top edge of the window.

10 Claims, 4 Drawing Sheets

OUTER ←→ INNER

GLASS RUN SEAL COMPRISING CORNER MOLDINGS WITH INTEGRATED WINDOW SPACERS

FIELD OF THE INVENTION

The embodiments disclosed herein relate generally to a glass run seal with an integrated window spacer, and more particularly to a glass run seal corner molding with an integrated window spacer.

BACKGROUND

Automotive vehicles have upwardly/downwardly movable windows disposed in doors, for example, which may be powered manually or electrically. These movable windows include glass run seals that are disposed between the window and the window frame opening of the door. The glass run seal provides a track within which the window moves upwardly/downwardly within the window frame opening and a seal for the inner surface and outer surface of the window within the window frame opening. The glass run seal includes a horizontally-extending top (i.e. header) and opposed vertically-extending sides along its length that correspond to the window features.

Current glass run seals located along the inside of a vehicle window frame have a cross-section that includes an inner portion and an opposed outer portion are joined to opposed ends of a base portion. The inner surfaces of these portions provide a c-shape channel that opens into the window opening and is configured to receive a movable window glass and both seal and support the glass. Existing glass run seals include separate spacers. These spacers are generally located at the top or header of the glass run seal between the outer surface of the base of the c-shape channel and the upper sash door of the door frame. Window glass stops or absorbers also exist that extend across the entire length of the top of the glass run seal. Glass run seals have also been proposed with spacers that include two or three ribs. These spacers and their associated ribs extend within the glass run seals along both the vertically-extending sides and horizontally-extending top of the seals. These spacers require a deceleration rib that is designed to engage the window glass first to engage and decelerate a moving window as well as one or more spacer ribs.

In view of the above, glass run seals with improved spacers are very desirable.

SUMMARY OF THE INVENTION

A glass run seal is disclosed. The glass run seal comprises: a glass run seal molding having a substantially c-shaped cross section channel comprising a base having an inner end and an outer end, an inner sidewall attached to the inner end and extending outwardly away from the base, and an opposed outer sidewall attached to the outer end and extending outwardly away from the base, the glass run seal molding extending along a length and comprising: a top portion that extends substantially horizontally from a first end to an opposed second end; a first side portion that extends downwardly away from the top portion from a first attached end to a first free end; a first corner portion attached on a first upper end to the first end of the top portion and on a first lower end to the first attachment end, the first corner portion comprising a first rib that is attached to the base and extends horizontally, the first rib protruding outwardly away from the base; a second side portion disposed opposite the first side portion that extends downwardly away from the top portion from an second attached end to a second free end; and a second corner portion attached on a second upper end to the second end of the top portion and on a second lower end to the second attachment end, the second corner portion comprising a second rib that is attached to the base and extends horizontally, the second rib protruding outwardly away from the base, the first side portion, first corner portion, top portion, second corner portion and second side portion configured to sealingly receive an upwardly/downwardly movable window having a corresponding first side edge, first corner edge, top edge, second corner edge, and second side edge, the first rib and the second rib configured to provide a predetermined gap between the base and top edge of the window along a predetermined length of the base of the top portion when the window is in a closed position.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
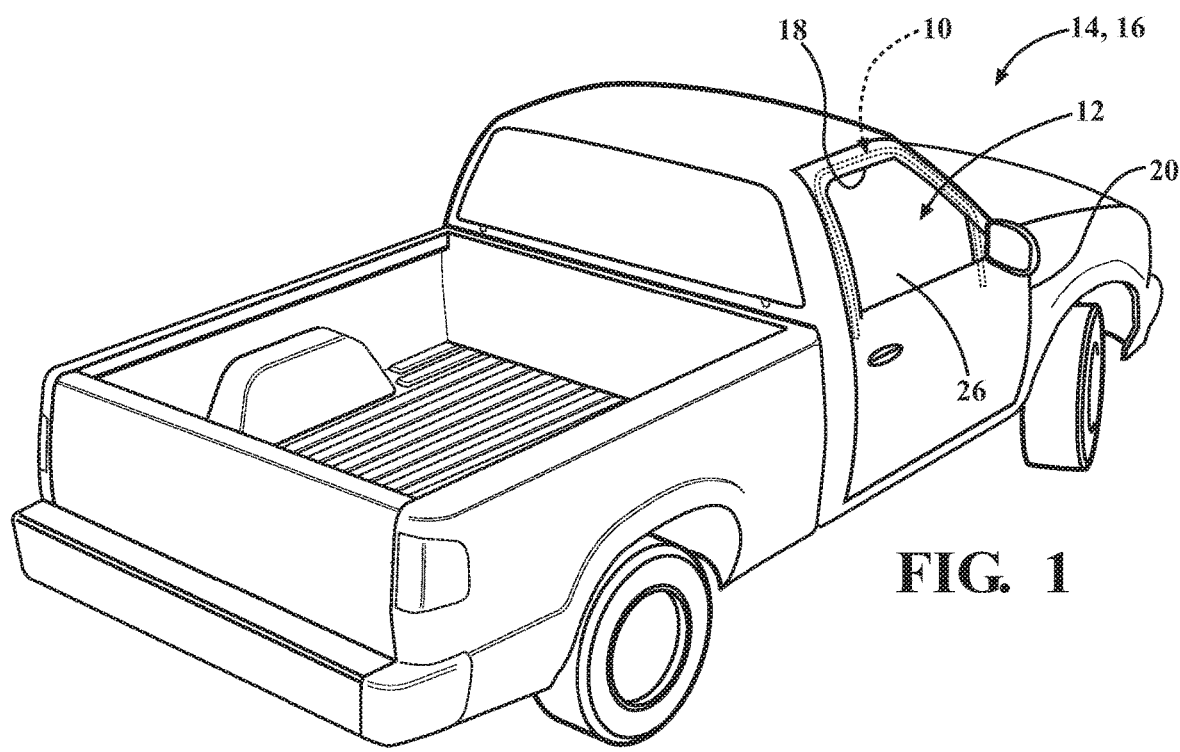
FIG. 1 is a perspective view of an exemplary embodiment of an automotive vehicle comprising an embodiment of a glass run seal.

The invention comprises a glass run seal and a glass run seal molding for an upwardly/downwardly selectively movable window of a vehicle, such as an automotive vehicle. The glass run seal provides a sealed enclosure or track for the selectively movable window to move up and down in. The glass run seal of the present invention incorporates an integral spacer or stop inside a c-shaped cross section channel in the form of a protruding rib at the base of each of two upper corner portions to provide a predetermined gap or space between the top edge of the selectively movable window and the base of a top (i.e. header) portion when the selectively movable window is in the closed position. With the hard stop, the spacer adds the predetermined gap between the top edge of the selectively movable window and the base, which in one embodiment is roughly a 0.8 mm gap, through the general section of the top portion. However, the predetermined gap may be of any suitable size (e.g. 0.2-2.0 mm) that reduces the overall surface contact between the selectively movable window and the base of the c-shaped cross section channel, thereby reducing the amount of contact surface that may cause noise, vibration, and harshness (NVH). The proposed glass run seal molding comprises a thermoplastic elastomer material that is formed by thermoplastic vulcanization (TPV). In one embodiment, the glass run seal molding comprises two downwardly-extending side portions (e.g. vertical) and a top portion. In addition, the glass run seal molding has the corner portions that create transition sections from the top portion to the respective side portions. The corner portions may be formed from a thermoplastic olefin (TPO), such as, for example, blends of polypropylene (PP) and un-crosslinked EPDM rubber and polyethylene. The proposed spacer will be incorporated along the top portion at each corner portion of the glass run seal molding. The invention comprises integrating a spacer into the two upper corner portions of existing glass run seals to provide a predetermined gap or space between the top edge of a selectively movable window (in the closed position) and the base of the top portion of the c-shaped cross section channel to reduce NVH generated through direct contact between the selectively movable window and the base of the top portion of the glass run seal/window frame opening when a moving selectively movable window strikes the base of the top portion.

As used herein, the terms front or forward or rear or rearward or aft refer to the front or rear of the article or vehicle, or to a direction toward the front or rear of the article or vehicle, respectively. The term longitudinal or along the length refers to a direction that extends along or generally parallel to an article or vehicle centerline between the front and the rear, or from one end to an opposed end. The term lateral or along the width or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle.

The glass run seal of this invention is a very advantageous improvement over glass run seals that employ multiple ribs, including a deceleration rib, to provide a predetermined gap between the base of the top portion and the top edge of the selectively movable window because it is not necessary to decelerate the movement of the selectively movable window first prior to providing the predetermined gap. Therefore, the glass run seal does not affect or otherwise limit the performance of the window closure system. Using one spacer rib at each upper corner of the selectively movable window ensures that the selectively movable window always will have the same position and orientation at the top (closed) position. Also, the present invention simplifies the design and reduces the probability of the glass run seal wearing or failing during service because of the reduced number of design elements (i.e. ribs) employed. In one embodiment, the glass run seal of the present invention may be described as incorporating a single or unitary opposed protruding ribs as a spacer to provide a predetermined gap or spacing of the top edge of the selectively movable window from the base of the glass run seal molding. In another embodiment, the present invention may be described both positively and negatively as incorporating a single or unitary opposed protruding ribs as a spacer to provide a predetermined gap or spacing of the top edge of the selectively movable window from the base of the glass run seal molding without the use of a decelerating rib or ribs and/or without affecting the performance of the window closure mechanism.

Figure 2:
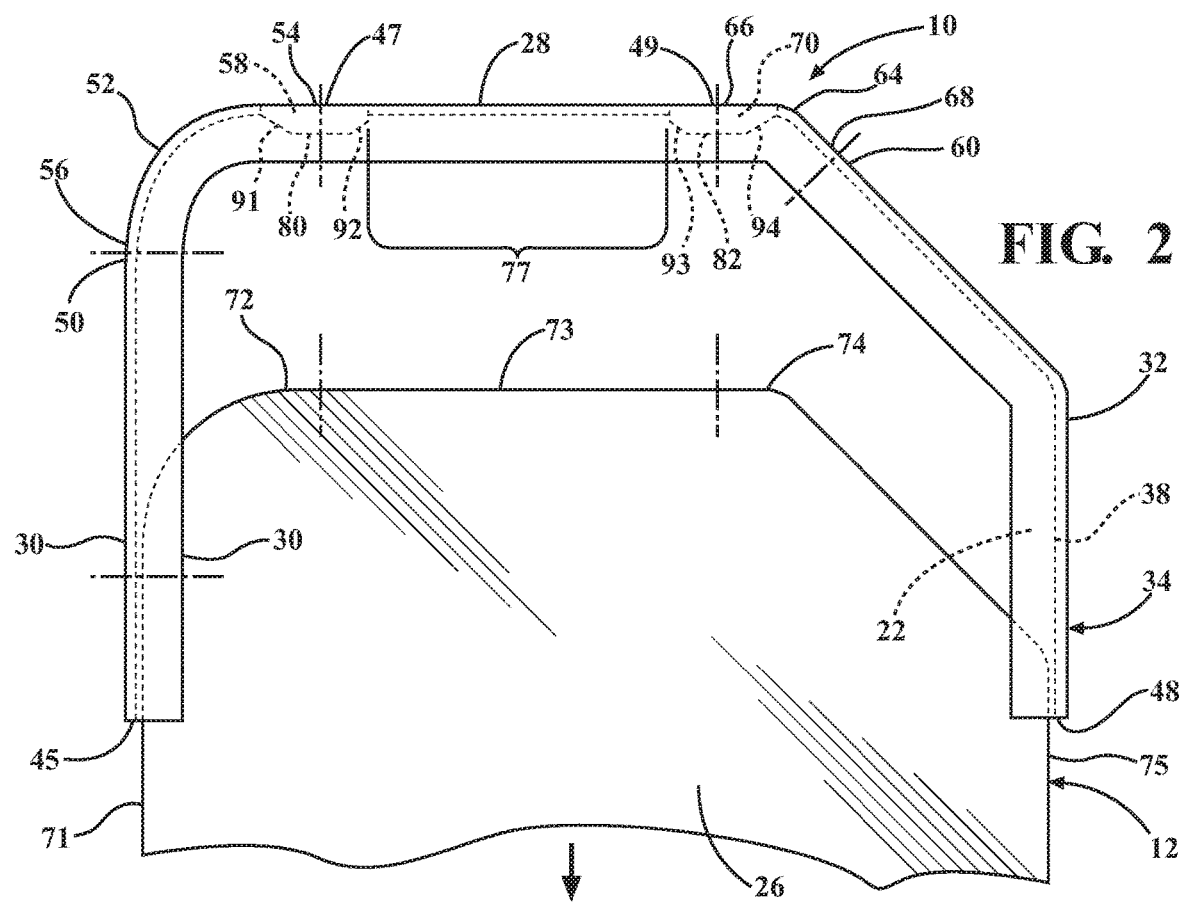
FIG. 2 is a schematic view of the glass run seal of FIG. 1.
Figure 3:
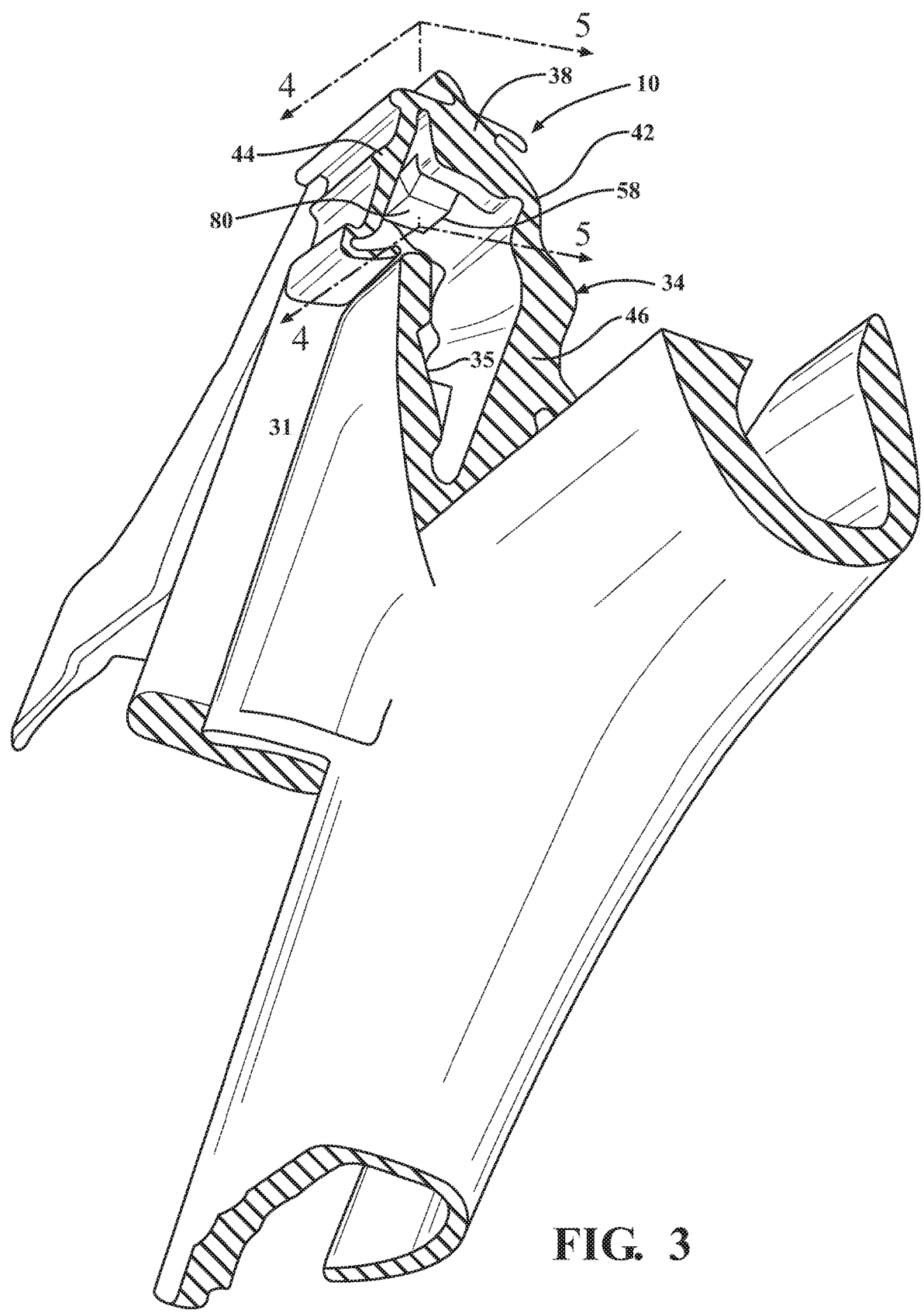
FIG. 3 is perspective partially cutaway sectional view of an embodiment of a glass run seal molding comprising a corner portion with an integrated spacer, as described herein.

Referring to FIGS. 1-5, this invention comprises a glass run seal 10 for a selectively movable window 12 or window glass of a vehicle 14, such as an automotive vehicle 16. The selectively movable window 12 is configured for selective upward/downward movement by a user. The selectively movable window 12 may be made from any suitable window material, including tempered glass, various polymers, or a combination thereof. This includes all manner of vehicles 14 that incorporate movable windows, including automotive vehicles 16 such as, for example, passenger cars and trucks as illustrated in FIG. 1. As shown in FIGS. 1 and 2, the selectively movable window 12 includes a glass run seal 10 that is disposed between the edges of the selectively movable window 12 and a window frame opening 18 of a door 20. The glass run seal 10 provides a track 22 within which the selectively movable window 12 moves upwardly/downwardly within the window frame opening 18 and a seal for an inner surface 24 and an outer surface 26 of the selectively movable window 12 within the window frame opening 18 (see FIG. 5). The glass run seal 10 includes a horizontally-extending top portion 28 (i.e. header) and opposed vertically-extending first and second side portions 30, 32 along its length that correspond to the features and shape of the selectively movable window 12.

Figure 4:
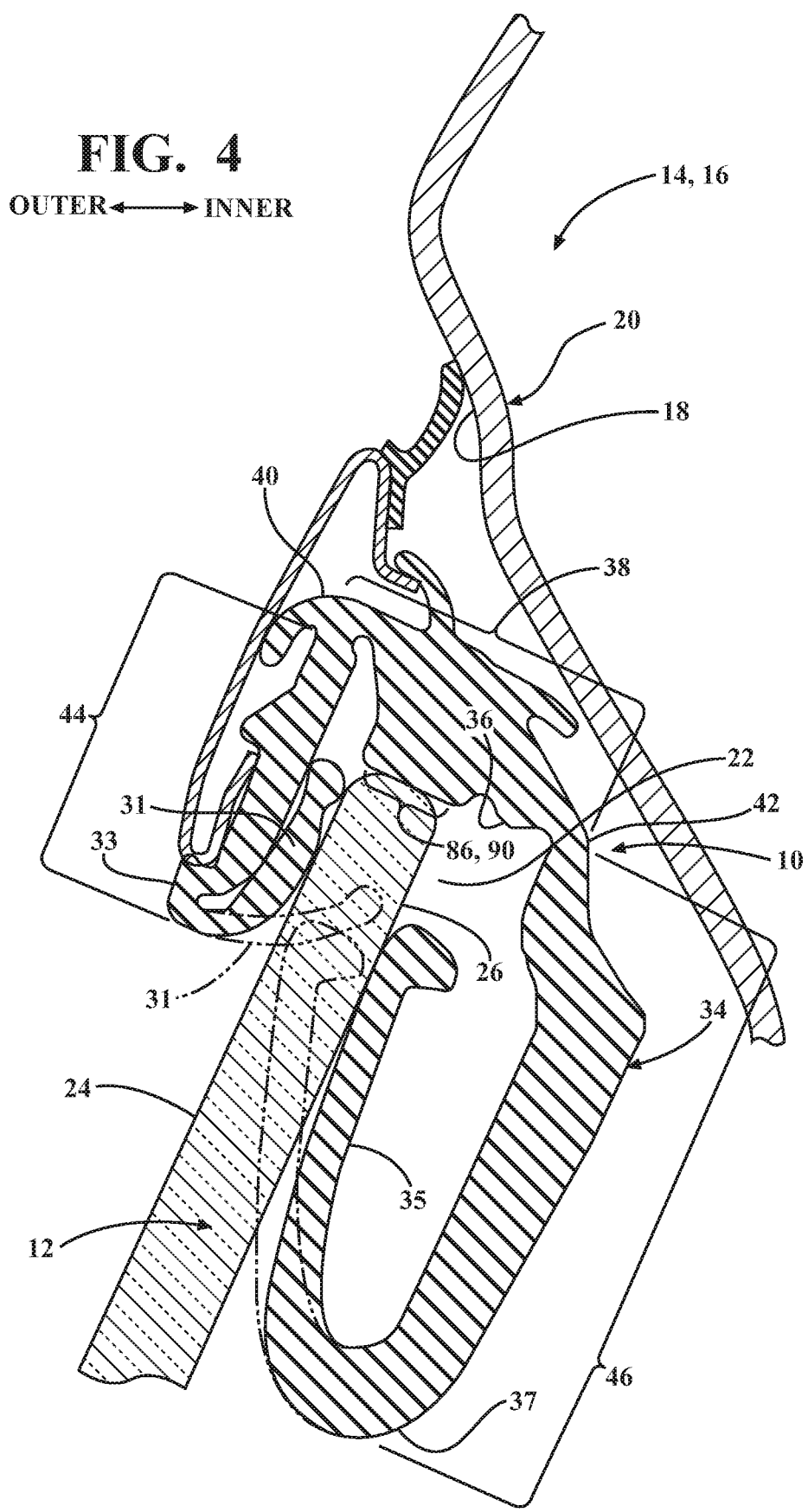
FIG. 4 is a cross-sectional view of the corner portion and integrated spacer of FIG. 3 taken along Section 3-3 shown with reference to the glass run seal.

The glass run seal 10 comprises a glass run seal molding 34 having a substantially c-shaped cross-section channel 36, which alternately may also be characterized as a u-shaped cross-section channel. The c-shaped cross-section channel 36 comprises a base 38 having an inner end 40 and an opposed outer end 42, an inner sidewall 44 attached to the inner end 40 and extending outwardly away from the base 38 and an opposed outer sidewall 46 attached to the outer end 42 and extending outwardly away from the base 38. The inner sidewall 44 comprises a flexible inner sealing finger 31 disposed on a distal end 33 of the inner sidewall 44 inwardly into the c-shaped cross-section channel 36 and the track 22 toward the selectively movable window 12 and the base 38. The flexible inner sealing finger 31 is illustrated in FIG. 4 in a deformed position whereby it is deformed by and seals the selectively movable window 12 when the selectively movable window 12 is in a closed position. The flexible inner sealing finger 31 is also illustrated in phantom in FIG. 4, as well as in FIG. 3, in a substantially undeformed position whereby the selectively movable window 12 has been moved to an open or partially open position outside the c-shaped cross-section channel 36. The outer sidewall 46 comprises a flexible outer sealing finger 35 disposed on a distal end 37 of the outer sidewall 46 inwardly into the c-shaped cross-section channel 36 and the track 22 toward the selectively movable window 12 and the base 38. The flexible outer sealing finger 35 is illustrated in FIG. 4 in a deformed position whereby it is deformed by and seals the selectively movable window 12 when the selectively movable window 12 is in the closed position. The flexible outer sealing finger 35 is also illustrated in phantom in FIG. 4, as well as in and FIG. 3, in an undeformed position whereby the selectively movable window 12 has been moved to an open or partially open position outside the c-shaped cross-section channel 36. In one embodiment in their substantially undeformed positions, the flexible inner sealing finger 31 and flexible outer sealing finger 35 are in touching contact with one another thereby sealing the substantially c-shaped cross-section channel 36 from the external environment when the selectively movable window 12 is not disposed therein, as shown in FIG. 4. The glass run seal molding 34 extends along a molding length defined as length from a first free end 45 of the first side portion 30 along the glass run seal molding 34 to a second free end 48 of the second side portion 32 in a shape that corresponds to the associated outer edges of the selectively movable window 12.

The glass run seal molding 34 and its constituent portions may be made from any suitable flexible material configured to seal the surfaces of the selectively movable window 12, including various elastomeric materials, such as various types of natural and synthetic rubber, and may be made by any suitable method or process. In one embodiment, the glass run seal molding 34 comprises a thermoplastic elastomer material that is formed by thermoplastic vulcanization (TPV). The glass run seal molding 34 may be formed as a single integral piece, such as by various forms of molding. Alternately, the constituent portions may be formed separately of the same or different materials by any suitable method, such as extrusion or molding, and attached or joined to one another by any suitable attachment or using any suitable attachment or joining method. In one embodiment, corner portions, including a first corner portion 52 and a second corner portion 64, may be formed separately from a different thermoplastic elastomer than the material used for the side portions and top portion, such as, for example, a thermoplastic olefin (TPO), such as, for example, blends of polypropylene (PP) and un-crosslinked EPDM rubber and polyethylene.

The top portion 28 extends along the length of the vehicle 14 substantially horizontally from a first end 47 to an opposed second end 49.

The first side portion 30 that extends downwardly away from the top portion 28 from a first attached end 50 to the first free end 45. The first side portion 30 may have any suitable shape or form needed to correspond the edge or edges of the selectively movable window 12 that it contains, including a shape that is linear, or curved, or a combination of adjoining non-parallel linear segments, or a combination of adjoining curved segments having different curvatures.

The first corner portion 52 is attached on a first upper end 54 to the first end 47 of the top portion 28 and on a first lower end 56 to the first attached end 50. The first corner portion 52 is a transition between the horizontally-extending top portion 28 and the downwardly extending first side portion 30. The first corner portion 52 comprises a first rib 58 that is attached to the base 38 and extends horizontally along the length of the base 38. The first rib 58 protrudes outwardly and downwardly away from the base 38. The first rib 58 comprises a first window stop and a spacer for the top edge 73 of the window as described herein.

The second side portion 32 is disposed opposite the first side portion 30 and extends downwardly away from the top portion 28 from a second attached end 60 to the second free end 48. The second side portion 32 may have any suitable shape or form needed to correspond the edge or edges of the selectively movable window 12 that it contains, including a shape that is linear, or curved, or a combination of adjoining non-parallel linear segments, or a combination of adjoining curved segments having different curvatures. The shape of the second side portion 32 may be the same as, or different than, the shape of the first side portion 30.

The second corner portion 64 is attached on a second upper end 66 to the second end 49 of the top portion 28 and on a second lower end 68 to the second attached end 60. The second corner portion 64 is a transition between the horizontally-extending top portion 28 and the downwardly extending second side portion 32. The second corner portion 64 comprises a second rib 70 that is attached to the base 38 and extends horizontally along the length of the base 38. The second rib 70 protrudes outwardly and downwardly away from the base 38. The second rib 70 comprises a second window stop and spacer for the top edge 73 of the selectively movable window 12 as described herein.

The first side portion 30, first corner portion 52, top portion 28, second corner portion 64 and second side portion 32 are configured to sealingly receive the selectively movable window 12 having a corresponding first side edge 71, first corner edge 72, top edge 73, second corner edge 74, and second side edge 75 both while the selectively movable window 12 is being moved up or down through them and when the selectively window 12 reaches a closed position during an upward movement as shown in FIGS. 1 and 4. The first rib 58 and the second rib 70 are configured to provide a predetermined gap 76 between the base 38 on an inner surface 39 and the top edge 73 of the selectively movable window 12 along a predetermined length 77 of the base 38 between the first and second ribs 58, 70 when the selectively movable window 12 is in the closed position. The protruding first and second ribs 58, 70 at the base 38 of each of the corner moldings 52, 64 provide the predetermined gap 76 or space between the top edge 73 of the selectively movable window 12 and the base 38 of the top portion 28 in the closed position of the selectively movable window 12. In one embodiment, the first rib 58 and the second rib 70 comprise hard stops or spacers to provide the predetermined gap 76 between the top edge 73 of the selectively movable window 12 and the base 38. The first rib 58 and second rib 70 may each be selected to have any suitable modulus of elasticity, and they may be selected to have the same elastic modulus or different elastic moduli. In one embodiment, the modulus of elasticity of the first rib 58 and the second rib 70 may be selected to be relatively high so that the motive force of the selectively movable window 12 provides no, or substantially no, compression or deflection of the first rib 58 and the second rib 70. In another embodiment, the modulus of elasticity of the first rib 58 and the second rib 70 may be selected to be relatively lower so that the motive force of the selectively movable window 12 provides a predetermined compression or deflection of the first rib 58 and the second rib 70, which predetermined compression or deflection will provide the predetermined gap 76 that is less than the uncompressed height of the first rib 58 and the second rib 70. In one embodiment, the predetermined gap 76 is substantially uniform along the predetermined length 77 of the base 38 in the top portion 28. In another embodiment, the predetermined gap 76 varies along the predetermined length 77 of the base 38 in the top portion 28. The predetermined gap 76 may be any suitable distance. In one embodiment, the predetermined gap 76 ranges from 0.2-2.0 mm. In one embodiment the predetermined gap 76 is 0.4-1.2 mm, and more particularly 0.8 mm. The predetermined gap 76 reduces the overall surface contact between the selectively movable window 12 and the base 38 within the top portion 28 of the c-shaped cross-sectional channel 36, thereby reducing the amount of contact surface that may cause noise, vibration, and harshness (NVH) upon closure of the selectively movable window 12 and due to its impact against only the first rib 58 and the second rib 70, rather than along the entire predetermined length 77 of the base 38 in the top portion 28.

Figure 5:
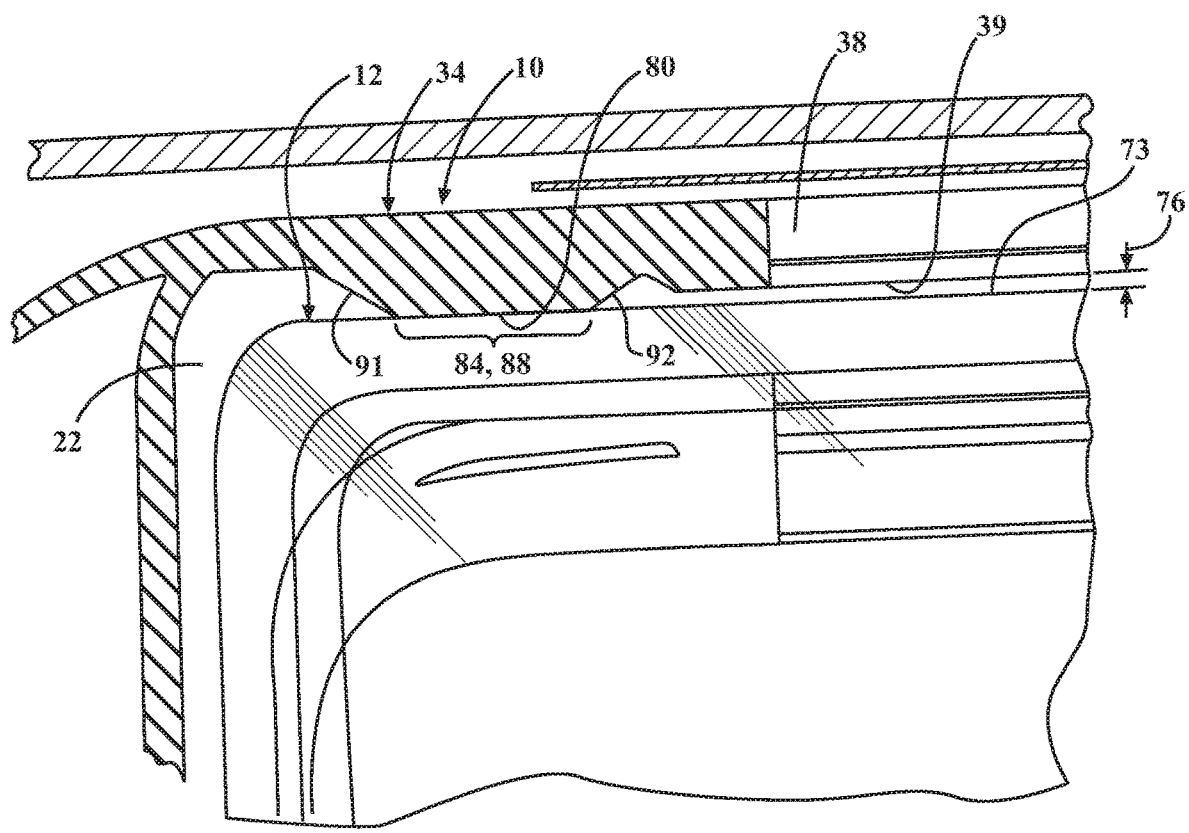
FIG. 5 is a cross-sectional view of the corner portion and integrated spacer of FIG. 3 taken along Section 4-4 shown with reference to the glass run seal.

In one embodiment, the first rib 58 comprises a first contact surface 80 that is substantially parallel to the base 38 of the top portion 28 and the second rib 70 comprises a second contact surface 82 that is substantially parallel to the base 38 of the top portion 28. In one embodiment, the first contact surface 80 is substantially rectangular and has a first length 84 and a first width 86, and the second contact surface 82 is substantially rectangular and has a second length 88 and a second width 90, which are the same as the first length 84 and the first width 86, as shown in FIGS. 4 and 5. In one embodiment, the first length 84 is greater than the first width 86 and the second length 88 is greater than the second width 90. By substantially rectangular, the surfaces are intended to include all four-sided polygonal shapes, including various rounded polygonal shapes.

In one embodiment, the first rib 58 comprises two opposed longitudinally-extending first tapered sections 91, 92 that taper outwardly away from the first contact surface 80 toward the base 38, and the second rib 70 comprises two opposed longitudinally-extending second tapered sections 93, 94 that taper outwardly away from the second contact surface 82 toward the base 38.

In one embodiment, the first rib 58 is integrally formed with the base 38 in the first corner portion 52, and the second rib 70 is integrally formed with the base 38 in the second corner portion 64. In another embodiment, the first rib 58 is formed separately from the base 38 in the first corner portion 52 and then joined to the first corner portion 52, and the second rib 70 is formed separately from the base 38 in the second corner portion 64 and then joined to the second corner portion 64.

In one embodiment, the first corner portion 52 and the second corner portion 64 are each formed as a separate component and are joined to the respective other portions of the glass run seal molding 34. In another embodiment, the first corner portion 52 and the second corner portion 64 are integrally formed as a single piece together with the respective other portions of the of the glass run seal molding 34.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A glass run seal, comprising:
a glass run seal molding having a substantially c-shaped cross section channel comprising a base, and an inner sidewall and an opposed outer sidewall attached to and extending outwardly away from the base, the glass run seal molding extending along a length and comprising:
a top portion that extends substantially horizontally;
a first side portion and a second side portion disposed opposite the first side portion that extend downwardly away from the top portion;
a first corner portion attached to the top portion and to the first side portion, the first corner portion comprising a first rib attached to and protruding outwardly away from the base, the first rib extending horizontally; and
a second corner portion attached to the top portion and to the second side portion, the second corner portion comprising a second rib attached to and protruding outwardly away from the base, the second rib extending horizontally; wherein
the first side portion, first corner portion, top portion, second corner portion and second side portion are configured to sealingly receive a selectively movable window having a corresponding first side edge, first corner edge, top edge, second corner edge and second side edge, and the first rib and the second rib are configured to provide hard stop first contact between the top edge of the selectively movable window and the base when the selectively movable window is moved to a closed position, and provide a predetermined gap between the base and the top edge of the selectively movable window along a predetermined length the base in the top portion when the selectively movable window is in the closed position.

2. The glass run seal of claim 1, wherein the first rib comprises a first contact surface that is only substantially parallel to the base of the top portion and the second rib comprises a second contact surface that is only substantially parallel to the base of the top portion.

3. The glass run seal of claim 2, wherein the first contact surface is substantially rectangular and has a first length and a first width and the second contact surface is substantially rectangular and has a second length and a second width.

4. The glass run seal of claim 3, wherein the first length is greater than the first width and the second length is greater than the second width.

5. The glass run seal of claim 3, wherein the first rib comprises two opposed longitudinally extending first tapered sections that taper outwardly away from the first contact surface toward the base and the second rib comprises two opposed longitudinally extending second tapered sections that taper outwardly away from the second contact surface toward the base.

6. The glass run seal of claim 1, wherein the predetermined gap is substantially uniform along the predetermined length of the base.

7. The glass run seal of claim 1, wherein the predetermined gap is from 0.2 mm to 2.0 mm.

8. The glass run seal of claim 1, wherein the first rib is integrally formed with the base in the first corner portion and the second rib is integrally formed with the base in the second corner portion.

9. The glass run seal of claim 1, wherein the first corner portion and the second corner portion are each formed as a separate component and the first corner portion is joined to the first side portion and the top portion and the second corner portion is joined to the second side portion and the top portion.

10. The glass run seal of claim 1, further comprising an automotive vehicle that comprises a door having a window frame and a window opening therein, the window frame having the glass run seal disposed therein.

* * * * *

UNITED STATES PATENT AND TRADEMARK OFFICE
CERTIFICATE OF CORRECTION

PATENT NO. : 10,710,440 B1
APPLICATION NO. : 16/397063
DATED : July 14, 2020
INVENTOR(S) : Engstrom et al.

Page 1 of 1

It is certified that error appears in the above-identified patent and that said Letters Patent is hereby corrected as shown below:

In the Specification

Column 6, Line 10: replace "the selectively window 12" with --the selectively movable window 12--
Column 6, Line 53: replace "the c-shaped cross-sectional channel 36" with --the c-shaped cross-section channel 36--

In the Claims

Column 8, Line 49: replace "a predetermined length the base" with --a predetermined length of the base--

Signed and Sealed this
Sixth Day of October, 2020

Andrei Iancu
*Director of the United States Patent and Trademark Office*